United States Patent
Singh et al.

(10) Patent No.: US 9,423,957 B2
(45) Date of Patent: Aug. 23, 2016

(54) ADAPTIVE SYSTEM PROVISIONING

(71) Applicants: Ashish Kumar Singh, Hyderbad (IN); Sai Eswar Garapati, Hyderbad (IN)

(72) Inventors: Ashish Kumar Singh, Hyderbad (IN); Sai Eswar Garapati, Hyderbad (IN)

(73) Assignee: CA, Inc., New York, NY (US)

( * ) Notice: Subject to any disclaimer, the term of this patent is extended or adjusted under 35 U.S.C. 154(b) by 121 days.

(21) Appl. No.: 14/268,317

(22) Filed: May 2, 2014

(65) Prior Publication Data

US 2015/0317081 A1 Nov. 5, 2015

(51) Int. Cl.
*G06F 3/06* (2006.01)
*G06F 9/48* (2006.01)
*G06F 9/50* (2006.01)

(52) U.S. Cl.
CPC .............. *G06F 3/06* (2013.01); *G06F 3/0607* (2013.01); *G06F 3/0665* (2013.01); *G06F 3/0689* (2013.01); *G06F 9/48* (2013.01); *G06F 9/4881* (2013.01); *G06F 9/50* (2013.01); *G06F 9/5038* (2013.01); *G06F 2209/486* (2013.01); *G06F 2209/5011* (2013.01)

(58) Field of Classification Search
CPC ................... G06F 2009/45562; G06F 9/4881; G06F 9/5038; G06F 9/505
See application file for complete search history.

(56) References Cited

U.S. PATENT DOCUMENTS

| | | | |
|---|---|---|---|
| 8,065,676 B1* | 11/2011 | Sahai | G06F 9/5077 709/226 |
| 2011/0125894 A1* | 5/2011 | Anderson | H04L 9/3213 709/224 |
| 2012/0096457 A1* | 4/2012 | Gupta | G06F 9/45558 718/1 |
| 2014/0344810 A1* | 11/2014 | Wang | G06F 9/455 718/1 |
| 2015/0143382 A1* | 5/2015 | Chen | G06F 9/5005 718/104 |

* cited by examiner

*Primary Examiner* — Edward Dudek, Jr.
(74) *Attorney, Agent, or Firm* — Baker Botts L.L.P.

(57) ABSTRACT

A method includes determining a plurality of configuration entries based on received provisioning requests and further based on provisioning system resource utilization data. Each configuration entry includes a corresponding virtual system template, and a corresponding number of virtual systems to be provisioned. The method also includes provisioning the corresponding number of virtual systems for a first configuration entry in the plurality of configuration entries. The corresponding number of virtual systems are provisioned based on the corresponding virtual system template for the first configuration entry. The method additionally includes storing the provisioned virtual systems in a resource pool and processing a provisioning request utilizing a pre-provisioned virtual system stored in the resource pool.

20 Claims, 4 Drawing Sheets

ADAPTIVE SYSTEM PROVISIONING

BACKGROUND

The disclosure relates generally to provisioning systems, and more specifically, to adaptive system provisioning.

SUMMARY

According to one embodiment of the disclosure, a method includes determining a plurality of configuration entries based on received provisioning requests and further based on provisioning system resource utilization data. Each configuration entry includes a corresponding virtual system template, and a corresponding number of virtual systems to be provisioned. The method also includes provisioning the corresponding number of virtual systems for a first configuration entry in the plurality of configuration entries. The corresponding number of virtual systems are provisioned based on the corresponding virtual system template for the first configuration entry. The method additionally includes storing the provisioned virtual systems in a resource pool and processing a provisioning request utilizing a pre-provisioned virtual system stored in the resource pool.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Organizations often turn to virtual system provisioning solutions to provide the necessary scale and flexibility required to meet application development, testing, production, and other resource requirements. For example, a software developer may require a certain server configuration for development of a web application. The testing team may require a separate server configuration for testing operations conducted in parallel. A separate web application may be hosted on yet another server configuration. Virtual system provisioning solutions may allow an administrator to allocate virtual servers to meet each requirement, without investing in new hardware for each hardware configuration change.

These provisioning solutions may be manual, automated, or some combination of the two. For example, a developer may manually request that a server with a particular configuration be allocated to the developer by filling in a service request ticket that may be made available via a web interface. An infrastructure administrator may manually provision a virtual system that conforms to the developer's request. As another example, a provisioning system may automatically provision a system having the configuration that the developer requested and may alert the developer when the system has been allocated to him/her.

The systems responsible for provisioning these virtual systems require resources such as processing capacity, memory, and hard disk, to process these requests. These resources may be physical or virtual. For example, the provisioning system may have a fixed amount of resources available to service incoming provisioning requests. Each request may require the provisioning system to partition memory, stand up a virtual machine image in a designated environment, and make that newly provisioned resource available to the individual requesting the resource. Such activities may be resource intensive, and may cause delays in allocating systems when provisioning system resources are low.

In certain provisioning systems, provisioning requests, such as those discussed above, may be submitted at regular times in a day, week, month, and/or according to events in a schedule, such as milestones in a development cycle. For example, for an organization having offices primarily in the United States, provisioning requests may predominantly correlate to the start of the work day in the Eastern, Central, Mountain, and Pacific time zones, i.e., UTC-5:00 to UTC-8:00. For example, provisioning requests may be received predominantly between 9:00 AM Eastern Time and 11:00 AM Pacific Time.

In certain provisioning systems, provisioning requests are received 24 hours a day. This may be due the international nature of the organization. For example, an organization may employ developers, and other employees that require access to provisioned systems. These employees may be located around the world. These employees may request resources at all times of the day because of the varying time zones in which they are located.

In certain provisioning systems, users may request that a particular architecture, application, specification, and/or additional details be included in a requested virtual system. However, the task the user needs to complete may not actually require each specific component listed in their provisioning request. For example, a user requesting a WINDOWS SERVER 2008® resource may be able to complete their assigned task using a prior or newer version of the operating system. The requesting user in the example above may be able to complete their assigned task using a virtual system running WINDOWS SERVER 2012®. Such users may be willing to accept an alternate system, but may be unaware of the existence of a pre-provisioned alternate system. In many cases, the alternate system may be allocated to the user faster and more efficiently than their previously requested system.

In certain embodiments of the present disclosure, systems described herein may utilize collected data, for example from previous provisioning requests, provisioning resource utilization, historical events and holidays, and other data sources, in order to more efficiently and more effectively provision and allocate virtual system resources. In certain embodiments, resources may be pre-provisioned and pooled. Resources may then be drawn from the pool when requested by a user. Thus, the provisioning process steps may be executed prior to receiving any provisioning request.

In certain embodiments, the pre-provisioned resources may be provisioned during periods when provisioning resources are under-utilized. In certain embodiments, the pre-provisioned resources may be provisioned during periods when it is unlikely that the provisioning system will receive provisioning requests.

In certain embodiments, the provisioning process described herein may be adaptive. For example, the provisioning process may evolve as more information is received. If a user makes a certain provisioning request, the provisioning system may predict future requests that may be received and may generate and/or modify a provisioning schedule to adapt to incoming provisioning requests and changes in provisioning resource utilization levels.

In certain embodiments, a pre-provisioned resource pool may be made visible to the user. Suggestions regarding similar resources that have already been provisioned may be made to the user. Thus, a user may request a particular resource, but may be presented with a list of available pre-provisioned resources. The user may select from the pre-provisioned resource pool or may insist on the requested resource.

In certain embodiments, user behavior may be modeled, and the provisioning schedule may account for such user behavior. For example, if a user often under-utilizes a requested system, the provisioning schedule may pre-provision a less powerful and/or more efficient resource for the user based on the user's previous resource utilization. Thus, user behavior may be modeled in the provisioning schedule.

Figure 1:
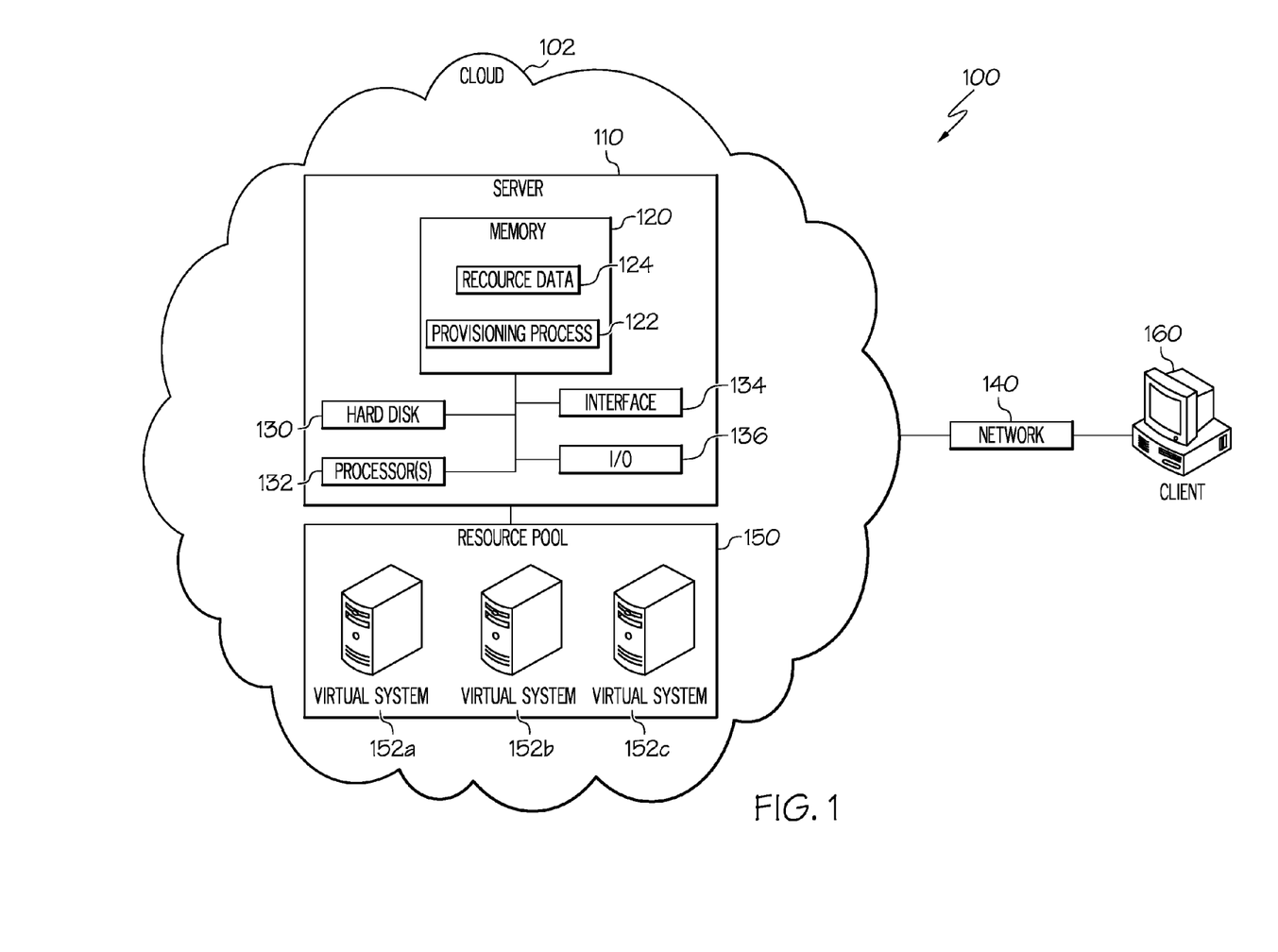
FIG. 1 illustrates a block diagram of a system for adaptive system provisioning in accordance with a particular non-limiting embodiment of the present disclosure.

Referring to FIG. 1, a system 100 for adaptive system provisioning is illustrated in accordance with a non-limiting embodiment of the present disclosure. System 100 includes cloud system 2 containing server 10, resource pool 50, and client 60 connected to cloud 2 by network 40. Server 10 includes memory 20, hard disk 30, processor(s) 32, interface 34, and input/output 36. Memory 20 includes provisioning process 22 and resource data 24. Provisioning process 22 may use resource data 24 and provisioning request data to generate a provisioning schedule. The provisioning schedule may have several system configurations that identify specifications for virtual system configurations. Each system configuration may also include a time that indicates when to provision virtual systems conforming to the system configuration, and a quantity that indicates how many conforming virtual systems to create at the time scheduled.

In certain embodiments, a provisioning schedule may be determined based on provisioning requests and resource utilization data. For example, provisioning process 22 may receive three requests for a new WINDOWS SERVER 2008® system each workday (i.e., Monday through Friday except on holidays). Based on this data, provisioning process 22 may determine that three such systems should be provisioned before the requests for these systems are received (i.e., pre-provisioning of systems).

Provisioning process 22 may further determine that provisioning resources are utilized at near capacity levels between the 8:00 AM and 10:00 AM hours. Thus, provisioning process 22 may schedule the three WINDOWS SERVER 2008® systems to be provisioned at some time before 8:00 AM.

In certain embodiments, provisioning process 22 may provision resources based on a provisioning schedule. For example, the provisioning schedule may direct provisioning process 22 to provision three WINDOWS SERVER 2008® systems at 5 AM. According to this schedule, provisioning process 22 may begin to provision the scheduled systems at the specified time. The pre-provisioned resources may be placed in resource pool 50. For example, virtual systems 52a-c may be provisioned according to the provisioning schedule by provisioning process 22 and may be placed in resource pool 50 until each is requested by and allocated to a user on client 60.

In certain embodiments, a user may be influenced to select a pre-provisioned selection. For example, a list of pre-provisioned systems may be displayed to the user via client 60. The pre-provisioned systems that are displayed may be determined based on a system configuration that the user requested. The pre-provisioned systems that are displayed may have similar characteristics to the requested system. In certain embodiments, the pre-provisioned systems displayed may be compatible and/or interchangeable with the requested system. The user may have the choice to select a pre-provisioned system from those in the list. In certain embodiments, the user may also request a customized system.

Figure 2:
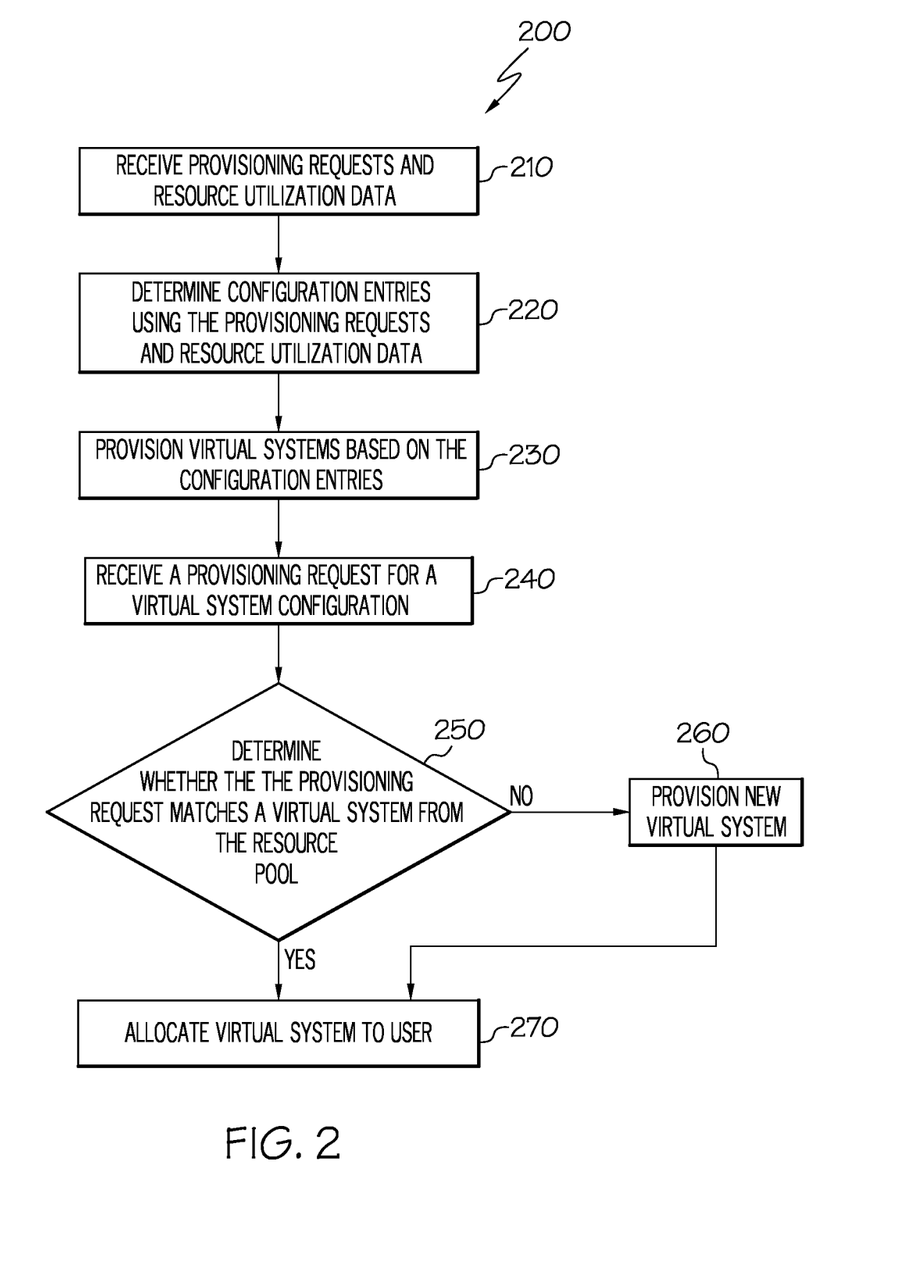
FIG. 2 illustrates a flow chart of a method for adaptive system provisioning in accordance with a non-limiting embodiment of the present disclosure.

With reference to FIG. 2, a flowchart 200 for adaptive system provisioning is illustrated in accordance with a non-limiting embodiment of the preset disclosure. At step 210, provisioning requests and resource utilization data are received. In certain embodiments, the resource utilization data may be received from a separate application, computer, or database that tracks resource metrics for a provisioning system. In certain embodiments, the provisioning system itself may track its own resource utilization. A process running on the provisioning system may receive the resource utilization data.

In certain embodiments, provisioning request information is received by the provisioning process. The provisioning request information may be compiled in a variety of ways. For example, the provisioning request information may be gathered by a request tracking process that stores the data in a database. In certain embodiments, the provisioning request information may be stored by the provisioning process as provisioning requests are received.

In certain embodiments, the provisioning system may use information from a resource metric management application. For example, sensors may detect resource load on various system resources in the provisioning system. The sensors may report utilization statistics to a dedicated resource utilization tracking system.

At step 220, a virtual system provisioning schedule is determined using the provisioning request data and the resource utilization data. In certain embodiments, the provisioning schedule may include configuration entries. Each configuration entry may have a virtual system template that describes a particular virtual system configuration. For example, the virtual system template may include details such as operating system, memory space, processor speed, processor type, system architecture, and hard disk space for a virtual system. The virtual system template may further include certain pre-configured applications, port configurations, and other specifications for a virtual system. In certain embodiments, the virtual system template may be a disk image, or may describe a disk image available to the provisioning process.

In certain embodiments, the configuration entries of the provisioning schedule may each contain a time when the provisioning of the described systems is to occur. The configuration entries may also contain a number that indicates the quantity of such systems to provision.

The provisioning schedule may be determined based on the provisioning request data and the resource utilization data. Data analysis operations may be run on the received data in order to predict further provisioning requests and resource utilization. Such analysis may change based on real-time provisioning requests received. In this way, the provisioning schedule may be adapted to changes in the provisioning system.

In certain embodiments, the provisioning schedule may be based on other criteria. For example, the provisioning schedule may be based on a number of employees in a development group, upcoming development cycle milestones, and other project management data that may be utilized to predict future resource provisioning needs, and provisioning system resource utilization.

In certain embodiments, the provisioning process may determine popular virtual machine configurations based on the provisioning requests. In certain embodiments, the provisioning process may determine versatile virtual machine configurations. For example, if a first group of regular users requests a particular configuration with a database installed, and a second group of regular users requests a particular configuration without the database installed, a system provisioned with the database installed may meet both user group needs. Thus, the database-included system may be scheduled for pre-provisioning to meet the needs of both groups.

At step 230, virtual systems are provisioned based on the virtual system provisioning schedule determined in step 220. In certain embodiments, the provisioned systems may be pre-provisioned systems because they are provisioned in anticipation of provisioning requests. The pre-provisioned systems may be stored in a resource pool.

The resource pool may contain a variety of pre-provisioned systems. For example, the provisioning schedule may list different system configurations to provision. The pre-provisioned pool may contain at least the pre-provisioned systems specified in the provisioning schedule.

At step 240, a provisioning request for a virtual system configuration is received. The provisioning request may be issued by a user by filling in a provisioning request ticket, or by asking an administrator for a particular system configuration, such as by email. In certain embodiments, a webpage is displayed to the user. The webpage may allow the user to select the particular system configuration from a list of pre-provisioned systems available.

For example, the webpage may list the available virtual systems currently available in the resource pool. These systems may be allocated or distributed to the user with little or no processing by the provisioning process. This may enable the user to gain access to the virtual system more quickly than waiting for a custom system to be provisioned. The user may be persuaded to select the pre-provisioned system because of this efficiency.

In certain embodiments, the webpage may suggest similar systems to the user. For example, a provisioning request may be received. Available pre-provisioned systems may be identified that are similar to the provisioning request. The webpage may present the available pre-provisioned systems to the user for selection. Thus, the system may suggest pre-provisioned systems based on the user's request.

In certain embodiments, the user may request a non-conforming system (i.e., a system that does not match any system in the pre-provisioned resource pool) but may accept use of a system from the resource pool. In this case, the provisioning process may adapt the provisioning schedule according to the user's request, and not according to the virtual machine configuration that the user accepted. Thus, the provisioning process may adapt the provisioning schedule to user preferences.

At step 250, the provisioning process may determine whether a system is available in the pre-provisioned resource pool that matches the configuration of the requested virtual system configuration. If a pre-provisioned system is located in the resource pool, the system is allocated to the requesting user at step 270.

At step 250, the provisioning process may determine that a system is not available in the pre-provisioned resource pool that matches the configuration of the requested virtual system configuration. In this case, the process may move to step 260, where a new virtual system is provisioned.

In certain embodiments, the user may determine that his/her work is dependent on certain features, applications, configurations, or other options that are not available on resources in the resource pool. In this case, the user may be presented with non-conforming systems to choose from, but may still choose to move forward with a custom provisioned system, regardless of the time required to provision the custom configured system.

In certain embodiments, the wait-time for such a custom configured system may be reduced because additional requests for system configurations matching the pre-provisioned systems may be reduced and/or eliminated. Thus, provisioning resources may be more available for custom system provisioning operations.

Figure 3:
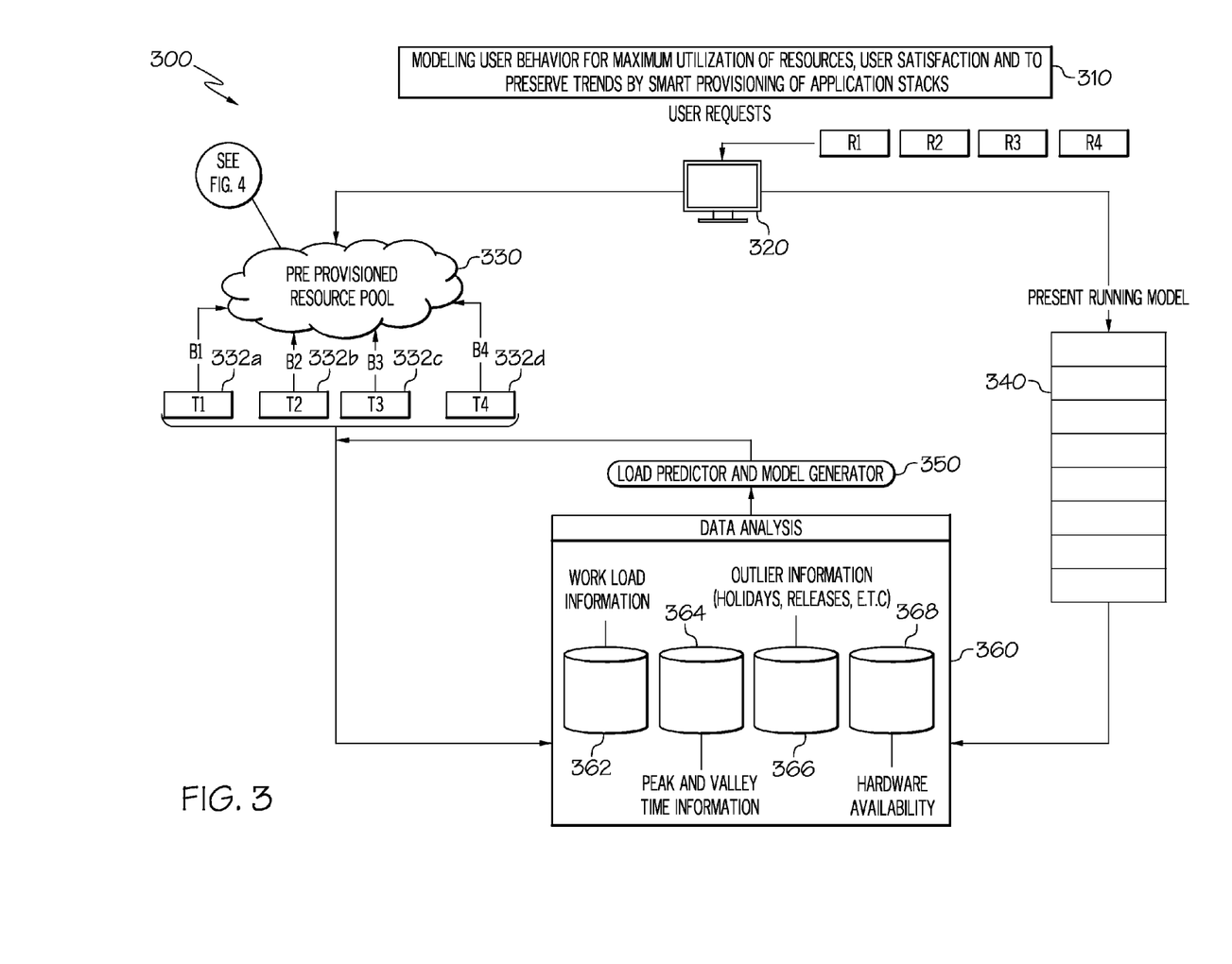
FIG. 3 illustrates a high level diagram of a system for adaptive system provisioning in accordance with a non-limiting embodiment of the present disclosure.

Referring to FIG. 3, a high level diagram of a system 300 for adaptive system provisioning is illustrated in accordance with a particular non-limiting embodiment of the present disclosure. System 300 includes user requests R1-4, provisioning system 320, pre-provisioned resource pool 330, load predictor and model generator 350, data analysis engine 360, and present running model 340. Present running model 340 may be a provisioning schedule. Provisioning system 320 may use load predictor and model generator 350 to analyze data from data analysis engine 360 to generate present running model 340. Provisioning system 320 may generate pre-provisioned resources 332a-d based on present running model 340. As requests R1-4 are received at provisioning system 320, pre-provisioned resources 332a-d may be allocated to users based on the received requests R1-4.

In certain embodiments, present running model 340 may reflect incoming user requests R1-4. The data analysis engine 360 may collect data from present running model 340, using load predictor and model engine generator 350, to create pre-provisioned resource pool 330. When future requests are received at provisioning system 320, the requests may be fulfilled using resources from the pre-provisioned resource pool.

Figure 4:
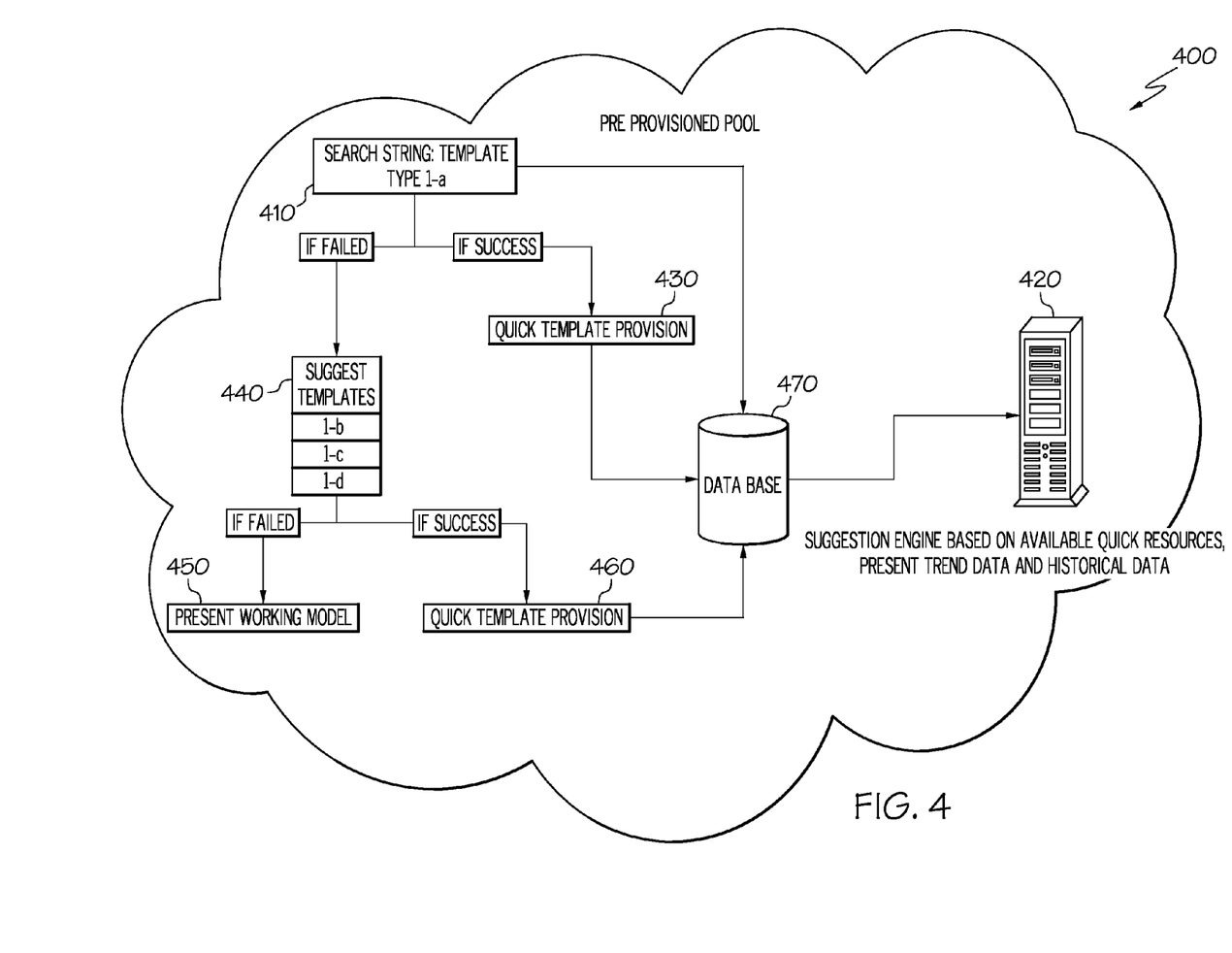
FIG. 4 illustrates a pre-provisioned resource pool in accordance with a particular non-limiting embodiment of the present disclosure.

With reference to FIG. 4, a pre-provisioned resource pool 400 is illustrated in accordance with a particular embodiment of the present disclosure. In certain embodiments, resource pool 400 includes a search process for locating systems in the pre-provisioned pool. If a template is found that matches the search string, the process moves to step 440 where similar templates are suggested. For example, the suggested templates may be displayed to the user via a web interface. If the user is persuaded to use a suggested template, then a corresponding pre-provisioned template is provisioned. If the user is not persuaded to use a suggested template, then a custom system is provisioned that matches the user's submitted template.

In certain embodiments, if the user's request matches a template in pre-provisioned pool 400, a matching pre-provisioned system may be allocated to the user. Data from the submitted request may be channeled to suggestion engine 420 in order to adapt to changing provisioning request trends.

Certain embodiments of the present disclosure may enable the modeling of user behavior such that resource utilization may be increased. For example, user utilization of requested resources may be monitored. The system may determine that a user is under-utilizing a provisioned resource. When the user next requests a provisioned resource, the system may suggest a more efficient resource for the user. For example, if the user requests a large amount of processing capacity and memory, but only utilizes a small fraction of the provisioned system's resources, the system may pre-provision a system having less processing capacity and memory and/or may suggest that the user request such a system. The system may further identify the reasons for making such a suggestion.

In certain embodiments, user satisfaction may be increased. In certain embodiments, utilization trends may be predicted and preserved. Application stacks, virtual machines, virtual systems, and/or any computing system may be provisioned in a manner that benefits these objectives.

In certain embodiments, an adaptive model may be generated based on data analysis. For example, the adaptive model may be based on an analysis of historical data. As another example, the adaptive model may be based on trend data analysis. As yet another example, the adaptive model may be based on analysis of hardware resource data. As a further example, the adaptive model may be based on utilization rates in combination with an analysis of predictive data.

In certain embodiments, the load modeling may continuously run based on real-time provisioning events, requests, and usage. The modeling may attempt to estimate provisioning needs such that pre-provisioned systems may be generated in such a fashion that workload consistency and utilization of provisioning resources are improved.

The teachings of the present disclosure may benefit existing systems by improving each of the following common problems. In certain embodiments, turn-around time for system provisioning may be improved. In certain embodiments, changing business requirements may be better addressed. Changing customer needs may also be better addressed. In certain embodiments, provisioning requests made during peak provisioning times may be better fulfilled. System failures occurring during these peak provisioning times may be reduced.

In certain embodiments, customer wait time during peak provisioning times may be reduced. For example, pre-provisioned template systems may be allocated to some users. This immediate allocation may free up provisioning resources for provisioning additional systems, thus reducing wait time.

In certain embodiments load across provisioning resources may be continuously measured, modeled, and/or analyzed. Adaptive provisioning actions may be automated in accordance with the measurements, models, and analyses. Such adaptive processes may be undertaken in real-time in accordance with user interaction, resource consumption, and provisioned system requests.

In certain embodiments, buffers may be enhanced and/or created for resources that are highly utilized. For example, commonly requested systems may be created in anticipation of future and/or present resource requirements. These pre-provisioned systems may be allocated when requests are received. Thus, resources used in provisioning systems may be more constantly utilized. Discrepancies between peak and valley resource utilization may be decreased. Resources used to provision systems may thus be scaled to more appropriately handle the constant work load.

For example, provisioning resources may be set up to meet peak utilization needs. However, these resources are under-used during all other times. Further, users may only be concerned with provisioning resource performance during a small portion of the day, week, or month. Other times of the day may be utilized to schedule anticipatory and adaptive provisioning tasks. Through adaptive and predictive scheduling, performance during peak utilization times may be enhanced.

In certain embodiments, customer satisfaction may additionally be enhanced. For example, a developer may request that a development server to be used for day-to-day web development tasks be provisioned to him/her from a pool of systems in a cloud environment. Normally, provisioning such a system may take a set amount of time. However, requests such as this may be redundant across an organization. For example, many developers may request for such a system on a daily, weekly, or any periodic basis. Thus, when redundant requests for systems are received, the amount of time it takes the provisioning resources to provision such a system may be exponentially increased because of over-utilization of system resources.

In certain embodiments, user wait-time may be decreased by pre-provisioning systems that are subject to frequent and redundant requests. Such embodiments may reduce provisioning resource utilization during peak provisioning times. Thus, customer satisfaction may be enhanced both for users that request systems that are subject to redundant requests, and for those users requesting more specialized and rare systems.

In certain embodiments, workload consistency across provisioning resources may be maintained. Provisioning tasks may be scheduled during non-business hours, or at times when provisioning requests are predicted to be low. Thus, provisioning tasks may be run during non-peak hours. Thus, provisioning resources may be more constantly used. Constant utilization of provisioning resources may enable cost savings by tailoring provisioning resource allocation to the constant predicted utilization rates. Idle provisioning resource utilization time may be decreased by such processes.

In certain embodiments, a pre-provisioned pool is generated so that provisioned systems may be allocated to users. The pre-provisioned pool may be generated according to various metrics. Metrics include, for example, historical data, trend data, resource utilization data, and hardware resource data. Such statistics may be tracked and monitored by the system.

The pre-provisioned pool may be selectively made available to users. For example, a user may select a template system from the pre-provisioned pool. In certain embodiments, the template may not meet the exact specification needs of the user. However, the user may determine whether there is a meaningful difference between the template system and the specific system they requested. For example, sometimes such differences may be arbitrary.

In certain embodiments, the user may weigh the costs and benefits of requesting a specified system. For example, the user may request a server with a specific operating system. However, the operating system may be arbitrary to the user. In other words, the user may not care which operating system is used on the server. In such an example, the user may request to use a pre-provisioned resource, even though the operating system available on the pre-provisioned resource may not meet the initial user specifications.

In certain embodiments, resources allocated from the pre-provisioned pool may present a speed advantage over those systems that must be provisioned as custom systems. For example, provisioning resources may not need to provision the system when the user request is received since the system has already been provisioned and is available in the pre-provisioned pool. Users may select a system from a list of pre-provisioned resources. Thus, the user may be influenced to select a pre-provisioned system from this list, rather than requesting a custom system. Thus, the pool may be made selectively available to users in a timely fashion based on historical data and the correlation between real-time situations and predicted situations.

In certain embodiments, the provisioning model is adaptive. The provisioning model may perform continuous modeling of resource utilization and/or load by selective recommendation of pre-provisioned systems. Thus, workload consistency and consistent utilization of resources may be achieved. In certain embodiments, the pre-provisioned resources may be provisioned according to historical trends and patterns. The pre-provisioning process may provision resources according to these trends so that each resource provisioned is used by a requesting user.

The teachings of the present disclosure may enable modeling of user behavior for maximum utilization of resources, user satisfaction, and preserving trends by smart provisioning of application stacks. The models prescribed in these embodiments may be an adaptive model based on the analysis of historical data, trend data, hardware resource data, and data correlations. Data correlations may include a correlation between the real-time rate of utilization and the predictive data. Data correlations may also perform continuous modeling of load by selectively recommending smart provisioned systems to maintain consistent workloads and benefit resource utilization.

In certain embodiments, provisioning requests may not be fulfilled instantaneously. For example, a virtual machine image can be acquired, but may require minutes and/or hours to be ready to use. Resources for running the image must be spun up and provisioned. The startup time may be dependent on many factors. For example, the startup time may be dependent on image size, virtual machine type, location of the provisioning resources or data center, the number of systems being provisioned, etc.

In certain embodiments, the teachings of the present disclosure may be applicable to a private cloud used to provision resources to users. For example, the users may be employees. In certain embodiments, the teachings of the present disclosure may be applicable maintenance of any virtualization environment. For example, the teachings of the present disclosure may be applicable to a public cloud, or any virtualization environment. Further, the teachings of the present disclosure may be applicable to physical system provisioning environments.

In certain embodiments, the teachings of the present disclosure may be applicable to a public cloud environment, a virtual private cloud environment, a physical server environment, or any other environment where provisioning and allocation services are useful and/or required.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   determining a plurality of configuration entries based on received provisioning requests and further based on provisioning system resource utilization data, each configuration entry comprising:
   a corresponding virtual system template; and
   a corresponding number of virtual systems to be provisioned;
   provisioning the corresponding number of virtual systems for a first configuration entry in the plurality of configuration entries, wherein the corresponding number of virtual systems are provisioned based on the corresponding virtual system template for the first configuration entry;
   storing the provisioned virtual systems in a resource pool;
   processing a provisioning request utilizing a pre-provisioned virtual system stored in the resource pool;
   determining under-utilized time periods based on the provisioning system resource utilization data, wherein the under-utilized time periods are indicative of time periods when provisioning system resource utilization falls below a utilization threshold; and
   scheduling each corresponding provisioning time from the plurality of configuration entries for a corresponding time utilizing the under-utilized time periods.

2. The method of claim 1, wherein each configuration entry in the plurality of configuration entries further comprises a corresponding provisioning time, and wherein the corresponding number of virtual systems for the first configuration entry are provisioned at the corresponding provisioning time.

3. The method of claim 2, further comprising:
   determining low-request time periods based on the provisioning requests, wherein the low-request time periods are indicative of time periods when a number of provisioning requests received does not exceed a predetermined threshold; and
   scheduling each corresponding provisioning time from the plurality of configuration entries for a corresponding time utilizing the low-request time periods.

4. The method of claim 1, further comprising:
   determining a frequently requested virtual system template based on the corresponding virtual system template for each of the provisioning requests; and
   adding, to the plurality of configuration entries, a configuration entry corresponding to the frequently requested virtual system template.

5. The method of claim 1, wherein the corresponding number of virtual systems are provisioned before receiving the provisioning request.

6. The method of claim 1, further comprising:
   formatting for display information indicative of the provisioned virtual systems in the resource pool.

7. The method of claim 1, further comprising:
modifying the plurality of configuration entries based on the provisioning request and an associated provisioning request time.

8. A computer configured to access a storage device, the computer comprising:
a processor; and
a non-transitory, computer-readable storage medium storing computer-readable instructions that when executed by the processor cause the computer to perform:
determining a plurality of configuration entries based on received provisioning requests and further based on provisioning system resource utilization data, each configuration entry comprising:
a corresponding virtual system template; and
a corresponding number of virtual systems to be provisioned;
provisioning the corresponding number of virtual systems for a first configuration entry in the plurality of configuration entries, wherein the corresponding number of virtual systems are provisioned based on the corresponding virtual system template for the first configuration entry;
storing the provisioned virtual systems in a resource pool; and
processing a provisioning request utilizing a pre-provisioned virtual system stored in the resource pool;
determining under-utilized time periods based on the provisioning system resource utilization data, wherein the under-utilized time periods are indicative of time periods when provisioning system resource utilization falls below a utilization threshold; and
scheduling each corresponding provisioning time from the plurality of configuration entries for a corresponding time utilizing the under-utilized time periods.

9. The computer of claim 8, wherein each configuration entry in the plurality of configuration entries further comprises a corresponding provisioning time, and wherein the corresponding number of virtual systems for the first configuration entry are provisioned at the corresponding provisioning time.

10. The computer of claim 9, wherein the computer-readable instructions further cause the computer to perform:
determining low-request time periods based on the provisioning requests, wherein the low-request time periods are indicative of time periods when a number of provisioning requests received does not exceed a predetermined threshold; and
scheduling each corresponding provisioning time from the plurality of configuration entries for a corresponding time utilizing the low-request time periods.

11. The computer of claim 8, wherein the computer-readable instructions further cause the computer to perform:
determining a frequently requested virtual system template based on the corresponding virtual system template for each of the provisioning requests; and
adding, to the plurality of configuration entries, a configuration entry corresponding to the frequently requested virtual system template.

12. The computer of claim 8, wherein the corresponding number of virtual systems are provisioned before receiving the provisioning request.

13. The computer of claim 8, wherein the computer-readable instructions further cause the computer to perform:
formatting for display information indicative of the provisioned virtual systems in the resource pool.

14. The computer of claim 8, wherein the computer-readable instructions further cause the computer to perform:
modifying the plurality of configuration entries based on the provisioning request and an associated provisioning request time.

15. A computer program product comprising:
a non-transitory computer-readable storage medium having computer-readable program code embodied therewith, the computer-readable program code comprising:
computer-readable program code configured to determine a plurality of configuration entries based on received provisioning requests and further based on provisioning system resource utilization data, each configuration entry comprising:
a corresponding virtual system template; and
a corresponding number of virtual systems to be provisioned;
computer-readable program code configured to provision the corresponding number of virtual systems for a first configuration entry in the plurality of configuration entries, wherein the corresponding number of virtual systems are provisioned based on the corresponding virtual system template for the first configuration entry;
computer-readable program code configured to store the provisioned virtual systems in a resource pool;
computer-readable program code configured to process a provisioning request utilizing a pre-provisioned virtual system stored in the resource pool;
computer-readable program code configured to determine low-request time periods based on the provisioning requests, wherein the low-request time periods are indicative of time periods when a number of provisioning requests received does not exceed a predetermined threshold; and
computer-readable program code configured to schedule each corresponding provisioning time from the plurality of configuration entries for a corresponding time utilizing the low-request time periods.

16. The computer program product of claim 15, wherein each configuration entry in the plurality of configuration entries further comprises a corresponding provisioning time, and wherein the corresponding number of virtual systems for the first configuration entry are provisioned at the corresponding provisioning time.

17. The computer program product of claim 16, wherein the computer-readable program code further comprises:
computer-readable program code configured to determine under-utilized time periods based on the provisioning system resource utilization data, wherein the under-utilized time periods are indicative of time periods when provisioning system resource utilization falls below a utilization threshold;
and
computer-readable program code configured to schedule each corresponding provisioning time from the plurality of configuration entries for a corresponding time utilizing the under-utilized time periods.

18. The computer program product of claim 15, wherein the computer-readable program code further comprises:
computer-readable program code configured to determine a frequently requested virtual system template based on the corresponding virtual system template for each of the provisioning requests; and computer-readable program code configured to add, to the plurality of configuration entries, a configuration entry corresponding to the frequently requested virtual system template.

19. The computer program product of claim 15, wherein the corresponding number of virtual systems are provisioned before receiving the provisioning request.

20. The computer program product of claim 15, wherein the computer-readable program code further comprises:
computer-readable program code configured to format for display information indicative of the provisioned virtual systems in the resource pool.

* * * * *